Sept. 15, 1970           T. H. ENGLE           3,528,709
ELECTRIC CURRENT-TO-PNEUMATIC PRESSURE TRANSDUCER
Filed Sept. 23, 1968           5 Sheets-Sheet 1
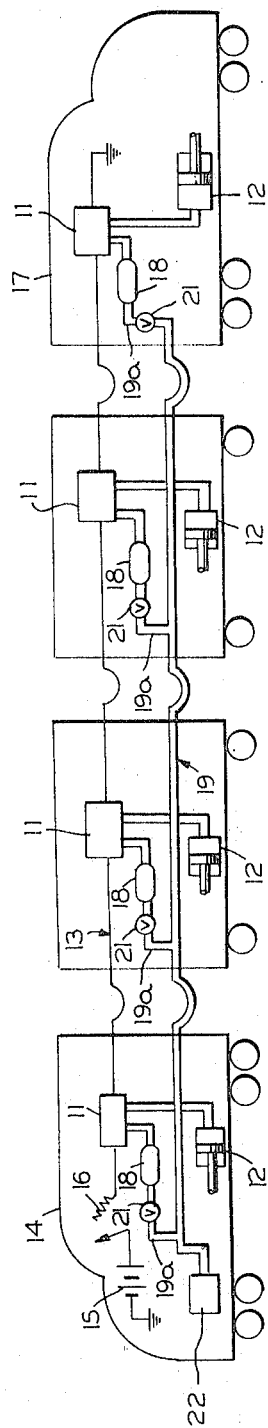
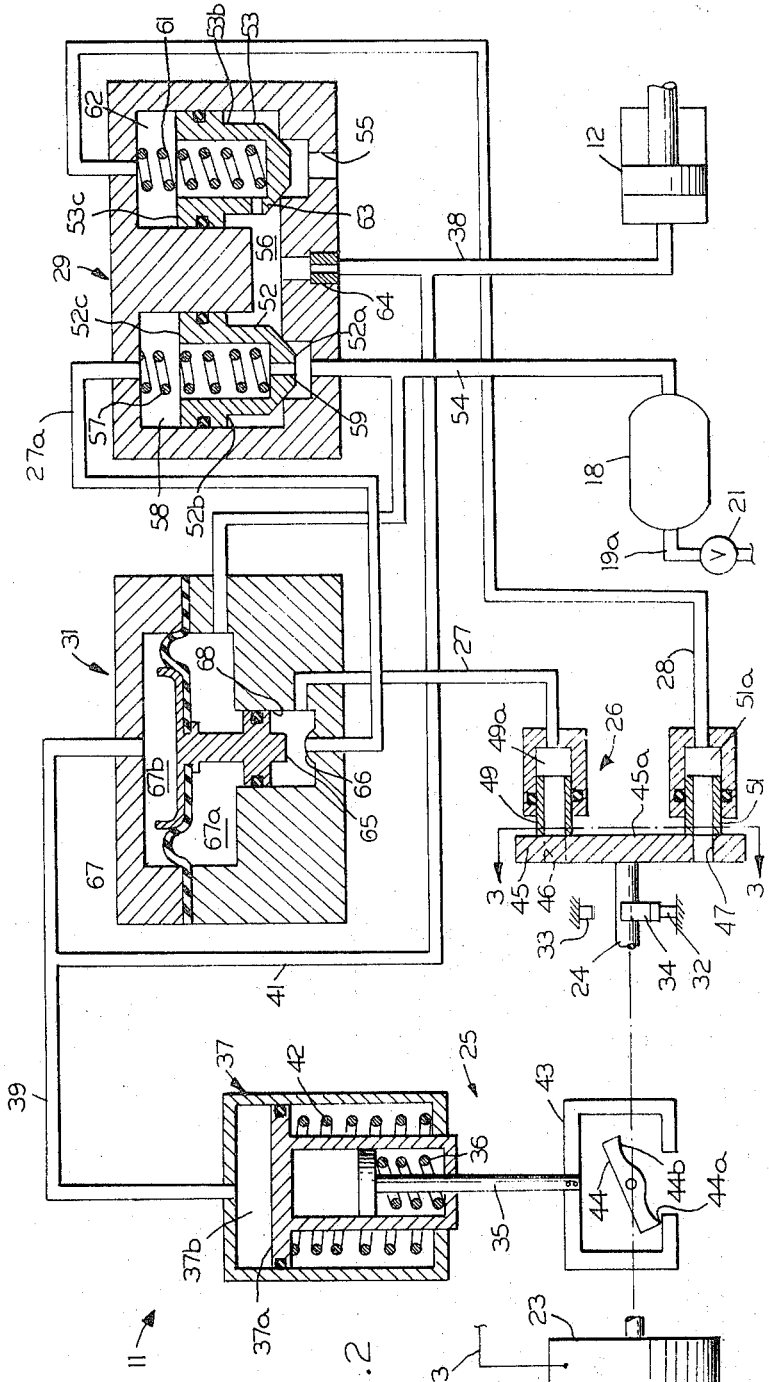
INVENTOR
THOMAS H. ENGLE
BY *Dodge and Sons*
ATTORNEYS

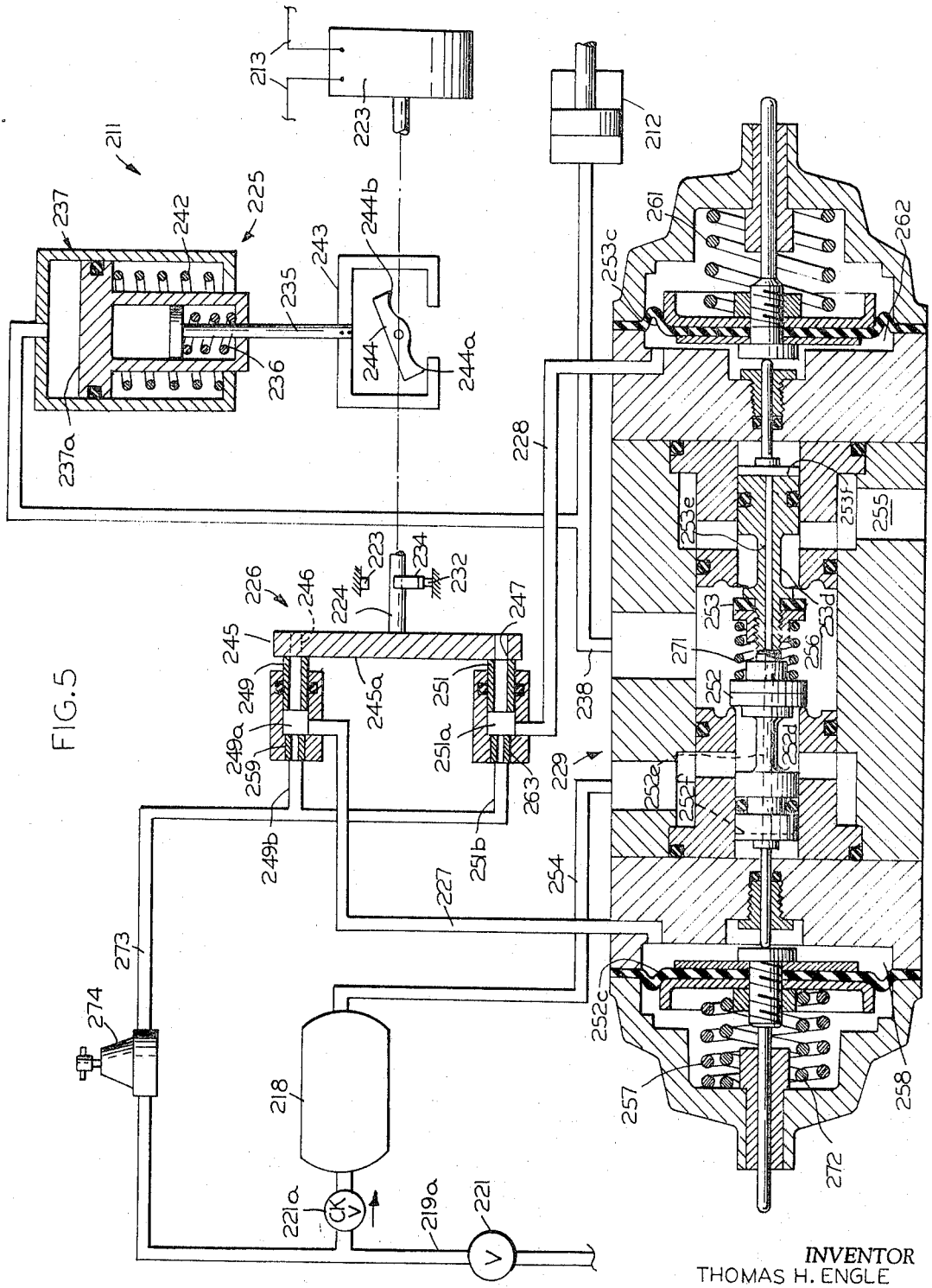

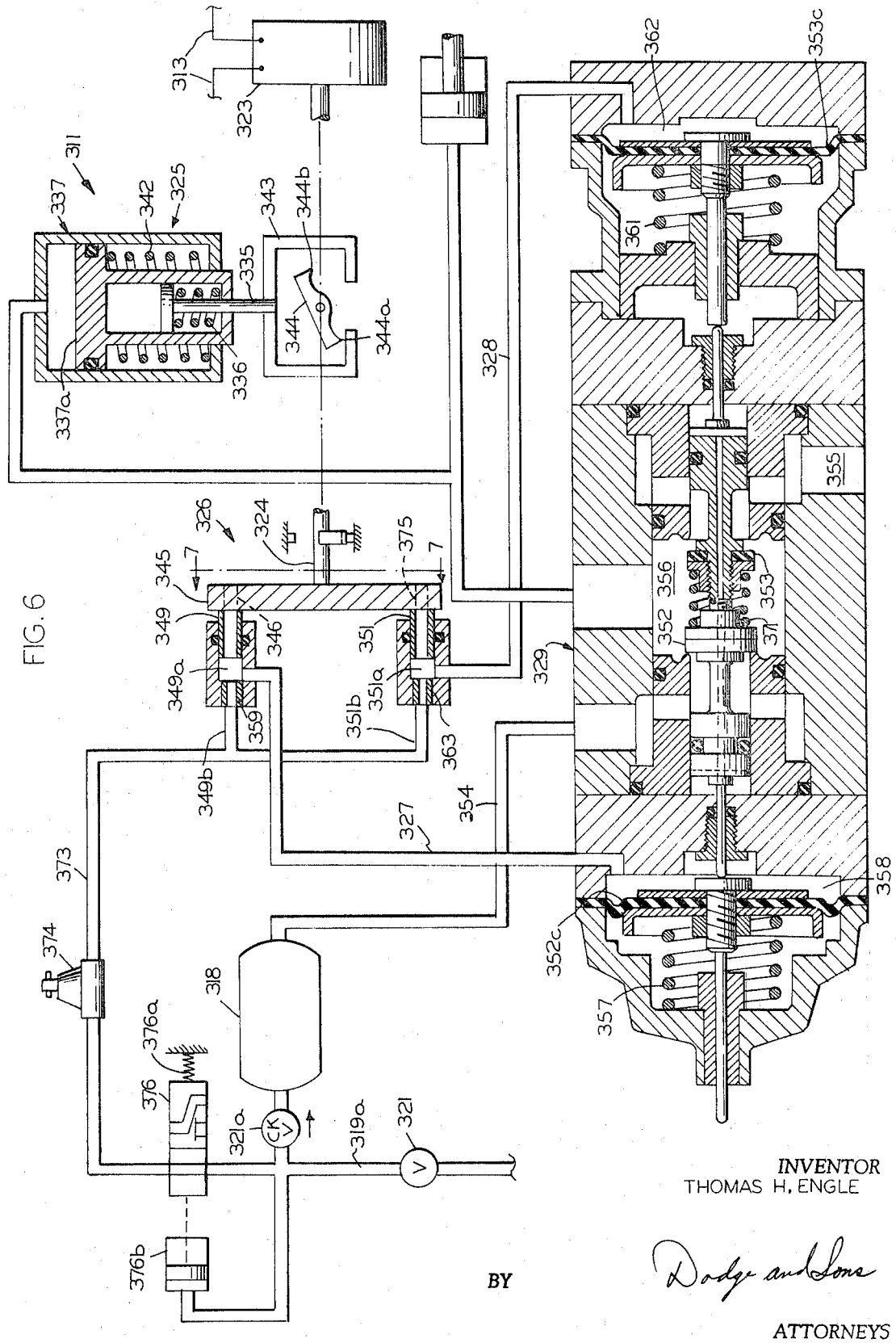

Sept. 15, 1970 T. H. ENGLE 3,528,709
ELECTRIC CURRENT-TO-PNEUMATIC PRESSURE TRANSDUCER
Filed Sept. 23, 1968 5 Sheets-Sheet 5
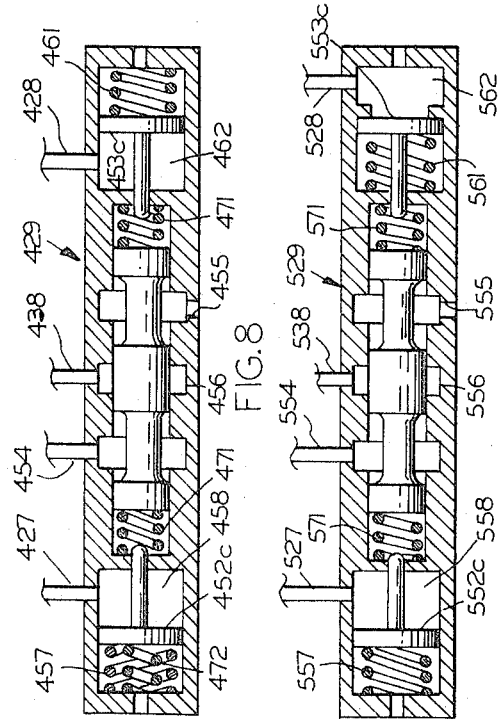
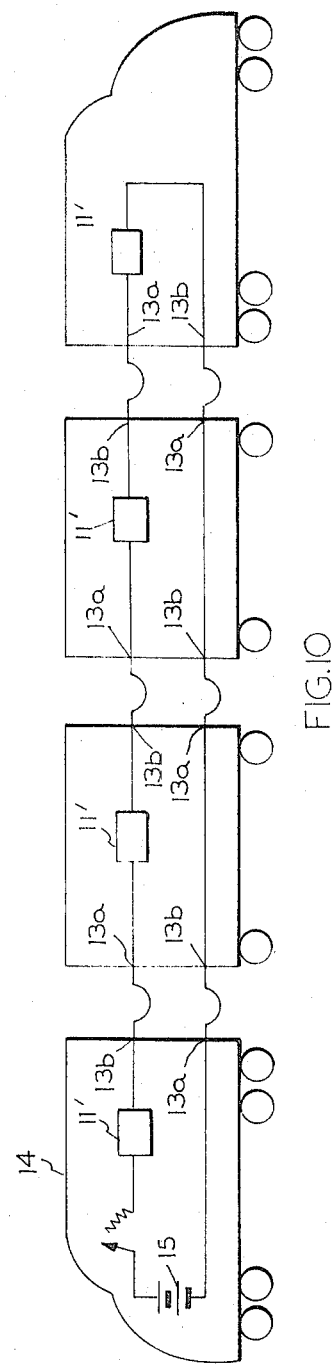
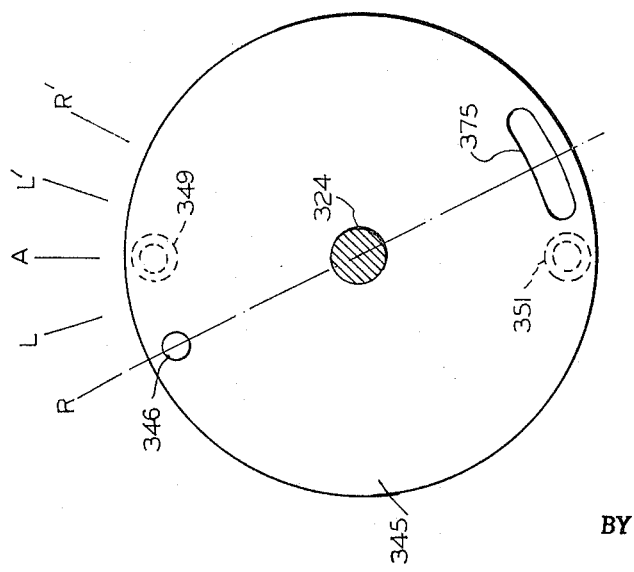
INVENTOR
THOMAS H. ENGLE
BY Dodge and Sons
ATTORNEYS

United States Patent Office 3,528,709
Patented Sept. 15, 1970

3,528,709
ELECTRIC CURRENT-TO-PNEUMATIC PRESSURE TRANSDUCER
Thomas H. Engle, Cape Vincent, N.Y., assignor to General Signal Corporation, a corporation of New York
Filed Sept. 23, 1968, Ser. No. 761,656
Int. Cl. B60t 13/68
U.S. Cl. 303—20                                30 Claims

ABSTRACT OF THE DISCLOSURE

Electric current-to-pneumatic pressure transducers suited for use in braking systems for railway cars. Each transducer is characterized by opposed electric and pneumatic torque motors which respond, respectively, to the control current and the outlet pressure and act upon a comparator shaft which positions a pair of pressure balanced pilot valves. These valves, acting through piloted motors, actuate main supply and exhaust valves that control air flow from a reservoir to the brake cylinder and from the latter to the atmosphere. All versions of the transducer effect a full brake application when the flow of electric current is interrupted, and some also are fail-safe with respect to malfunctions in the reservoir-charging circuit. Other embodiments prevent release of the brakes until the reservoir has been charged to a safe level. Several schemes are proposed for reducing the amount of air consumed by the pilot circuit.

BACKGROUND AND SUMMARY OF THE INVENTION

For many years, the automatic air brake has been the standard service brake employed by the railroad industry. Although this type of brake has proved satisfactory, it has certain undesirable characteristics. Probably the main disadvantage is its slow response. This is an inherent characteristic which is attributable to the fact that the brakes on each car are controlled in response to changes in brake pipe pressure, and the rate at which these changes are propagated through a train is limited by the speed of sound. Other disadvantages are the complexity and relatively high cost of the equipment, particularly the control valve, employed on each car, and the inability to effect a graduated release of the brakes.

The object of this invention is to provide an improved brake system which eliminates the disadvantages of the conventional air brake while retaining its essential fail-safe characteristic. The invention is concerned with an electropneumatic brake system wherein the brakes on each car are applied pneumatically, but are controlled in accordance with changes in the current in a control wire extending through the train. The heart of the invention is an electric current-to-pneumatic pressure transducer which establishes an output pressure which increases linearly with reductions in control current, and which operates at a sufficiently low level of electrical power to make practical and series control circuits required for fail-safe operation. The new system also employs a train-lined air pipe, but, unlike the brake pipe of the conventional air brake, this one serves solely to charge the supply reservoirs on the cars.

Each of the transducers described herein employs main supply and exhaust valves for controlling air flow to and from the brake cylinders, and which are actuated in accordance with piloting pressures developed within the transducer. The pilot circuit consumes air, but several schemes are proposed herein for minimizing that demand. Moreover, in some embodiments, the motive and piloting circuits are separated, so that the former is supplied from the reservoir and the latter is supplied directly from the charge pipe, and the transducer components are arranged to insure that a full brake application will be effected whenever charge pipe pressure decreases to a level indicative of a break-in-two or similar emergency condition. These embodiments, therefore, are fail-safe from both the electrical and the pneumatic standpoints. A further refinement insures that the brakes on each car will not be released until the reservoirs have been charged to the level required for safe operation of the train.

BRIEF DESCRIPTION OF THE DRAWINGS

Several representative embodiments of the invention are described herein with reference to the accompanying drawings in which:

FIG. 1 is a schematic showing a complete electropneumatic braking system employing the preferred single-wire control circuit.

FIG. 2 is a schematic diagram of one simple form of the transducer.

FIG. 5 is a schematic diagram of an improved form of the transducer.

FIG. 6 is a schematic diagram of the preferred transducer.

FIG. 7 is a sectional view taken on line 7—7 of FIG. 6.

FIGS. 8 and 9 are schematic diagrams of one alternative type of supply and exhaust valve which may be employed in the transducer of FIGS. 5 and 6, respectively.

FIG. 10 is a schematic diagram illustrating a two-wire control circuit.

It should be noted that, where possible, similar parts in the various embodiments described below are identified by reference numerals which differ only in the hundreds digit.

DESCRIPTION OF EMBODIMENTS OF FIGS. 1-4

Figure 3:
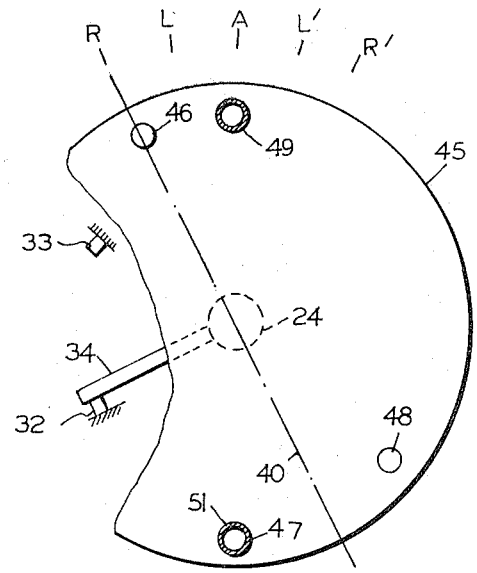
FIG. 3 is a sectional view taken on line 3—3 of FIG. 2.

As shown in FIG. 1, the transducer 11 of the invention is employed on each of the cars and motive units of a railway train to control the pressure supplied to the air-operated brake cylinders 12 in response to changes in the current flow through a control wire 13 extending through the train. In the head or controlling unit 14 of the train, wire 13 is connected with a DC source 15 through a combination switch and rheostat 16, and in the trailing unit 17, the wire is grounded to the metal body of the car. Thus, the return path to source 15 is through the rails and the bodies of units 14 and 17. The electrical connections between cars preferably are effected through the "gladhands" (not shown) used in the pneumatic portion of the system. These couplings make ideal connectors for the segments of control wire 13 because they are conductive and are insulated from the car bodies by the rubber hoses to which they are attached. Moreover, this arrangement insures that the electrical control circuit will be completed whenever the air pipes are connected, and obviates jumper cables which have proven troublesome in railroad service. The reservoirs 18 are connected with a charge pipe 19 through branch pipes 19a and are charged from the head end of the train by a compressor 22 located in unit 14. Each branch pipe 19a is equipped with a cut-off valve 21 containing a check valve which prevents loss of air from the reservoir 18 in the event of a break in pipe 19. The sections of charge pipe 19 in adjacent cars are, of course, joined by the "gladhands" just mentioned. Transducers 11 are wired in series and, as will be explained, are designed to release and apply the brakes as the current flowing through wire 13 increases and decreases, respectively. Therefore, train break-in-two or electrical equipment failure will cause a full application of the brakes. This failsafe action is essential to safe and reliable operation.

Referring to FIG. 2, each of the transducers 11 includes five main components, namely, an electrical torque motor 23 which responds to the current flow through wire 13 and exerts a proportional torque on a comparator shaft 24, a pneumatic torque motor 25 which applies to shaft 24 a resisting torque which decreases linearly with increases in the pressure supplied to brake cylinder 12, a pilot valve assembly 26 which is driven by shaft 24 and serves to control the pressure in a pair of pilot passages 27 and 28, a main valve assembly 29 which responds to the piloting pressures and serves to control the supply of air from reservoir 18 to brake cylinder 12 and the exhaust of air from the brake cylinder to atmosphere, and a cut-off valve 31 which interrupts the supply of air to brake cylinder 12 when brake cylinder pressure reaches a predetermined percent, for example 90%, of the supply (i.e., reservoir) pressure. The electric torque motor is of known design and comprises a permanent magnet rotor which rotates within a wound stator. The direction in which motor 23 rotates depends upon the direction of current flow through the stator, and, in the single-wire system of FIG. 1, this in turn depends upon which of the end units 14 and 17 is the controlling unit. The torque output, on the other hand, is directly proportional to the magnitude of the current and the sine of the magnetic angle between adjacent unlike poles of the rotor and stator. The angular motion of shaft 24 is limited by a pair of stops 32 and 33 which coact with an arm 34 fixed to the shaft; therefore, the sine of the magnetic angle is substantially constant, and torque will vary substantially linearly with current. In a typical case wherein the transducer employs a two-pole motor, the magnetic angle is held between 72° and 90°, regardless of the direction of rotation; thus, the sine is always between 0.95 and 1.00, and the deviation from true linearity is only 5%.

The pneumatic torque motor 25 comprises a drive rod 35 which is urged upwardly by a calibration spring 36 whose lower end is seated on a tubular extension of the piston 37a of an air motor 37. The working space 37b of motor 37 is connected with the outlet passage 38 of transducer 11 through passages 39 and 41, so the motor responds to the pressure supplied to brake cylinder 12. Downward movement of piston 37a is opposed by a meter spring 42 which is considerably stronger than calibration spring 36 and is so chosen that, for any given output pressure within the design range of the transducer, piston 37a will assume a definite position in its cylinder. The upward force which calibration spring 36 exerts on rod 35 varies inversely with the deflection of meter spring 42, and consequently is a negative function of transducer output pressure. Spring 36 is so designed that it exerts little or no force on rod 35 when output pressure is a maximum and piston 37a is in its lowest position, while, on the other hand, it applies a definite maximum force when the pressure in outlet passage 38 is zero and piston 37a is in its uppermost position. At its lower end, drive rod 35 carries a yoke 43 which acts upon shaft 24 through one of a pair of knife edges 44a and 44b located at opposite ends of a transverse arm 44 fixed to the shaft. The knife edges are spaced equally from the axis of shaft 24 so that, regardless of the direction of rotation of the shaft, motor 25 will apply the same resisting torque.

Pilot valve assembly 26 comprises a flat, hardened steel disc 45 which is fixed to rotate with comparator shaft 24 and contains three through ports 46–48; the port 46 being centered on the disc axis 40 (see FIG. 3), and the ports 47 and 48 being spaced from this axis equal distances in opposite directions. Cooperating with the disc is a pair of diametrically opposed, floating tubular valve seats 49 and 51 which bear against the ground and lapped disc face 45a and are arranged to selectively register, respectively, with the port 46 or one or the other of the ports 47 and 48. The seats 49 and 51 are held against disc 45 by the pressures in the chambers 49a and 51a at their right ends, and, since the cross sectional area of each seat which is subject to this biasing pressure is equal to the contact area of the seat and disc, the seats are essentially pressure balanced. This balancing feature minimizes the torque which motor 23 must develop to operate pilot valve assembly 26. This is vitally important because the motors 23 in the complete braking system are conected in series. Disc 45 and the seats 49 and 51 define a pair of pilot valves which are so arranged that:

(a) in the center or application position of the disc, labeled A in FIG. 3, valve 45, 49 is open, and valve 45, 51 is closed, (b) in either of the release positions, labeled R and R', valve 45, 51 is open, and valve 45, 49 is closed, and (c) in either of the intermediate lap positions, labeled L and L', both valves are closed.

In the illustrated embodiment it is assumed that stops 32 and 33 are positioned to allow disc 45 to move 18° to either side of the application position, and that each of the ports 46–48 and the inside bore of each of the seats 49 and 51 subtend an angle of 6°. With this arrangement, the application position A encompasses a 12° range of movement of disc 45, and each of the other positions, R, R', L and L' encompasses a 6° range of movement.

Main valve assembly 29 comprises a pair of piloted poppet valves 52 and 53 which control, respectively, connections between supply passage 54 and outlet passage 38 and between outlet passage 38 and an atmospheric vent port 55. The supply poppet 52 is urged open by reservoir pressure which acts upon nose 52a and by the pressure in outlet chamber 56 which acts upon annular surface 52b, and is urged closed by a spring 57 and a piloted motor which comprises the upper end face 52c of the poppet and a working space 58. The working space 58 communicates with supply passage 54 through a restricted passage 59 formed in poppet 52 and is connected with pilot valve 45, 49 through passage 27a, cut-off valve 31, and pilot passage 27. Thus, when the cut-off valve is open, poppet 52 will open and close, respectively, as pilot valve 45, 49 opens and closes. Since the pressure in chamber 56 acts upon annular area 52b and will rise to the level of the supply pressure as soon as poppet 52 moves away from its seat, it will be evident that the supply poppet opens with snap action.

The exhaust poppet 53 is urged open by the pressure in outlet chamber 56 which acts upon its annular reaction surface 53b and is urged in the opposite direction by spring 61 and by a piloted motor comprising upper end face 53c and working space 62. This working space communicates with outlet chamber 56 through a restricted passage 63 in poppet 53 and is connected directly with the pilot passage 28 leading to pilot valve 45, 51. Thus, as in the case of poppet 52, the exhaust poppet 53 opens and closes as its pilot valve 45, 51 opens and closes, respectively. Moreover, since the area of annular surface 53b subject to the pressure in chamber 56 increases as the poppet 53 moves away from its seat, this valve too opens with snap action.

It might be noted here that the poppet valves 52 and 53 afford quite large flow capacities and thus inherently can effect very rapid changes in the pressure in outlet passage 38 in cases where the load volume connected with this passage is small. The transducer 11 can be used to supply either a brake cylinder 12, as in the illustrated embodiments, or a relay valve, and in the latter case changes in output pressure may occur at a rate far greater than that with which the mechanical parts associated with comparator shaft 24 can keep pace. If this happens, the transducer will hunt, i.e., cause the pressure to fluctuate about the desired value. In order to avoid this, a choke 64 is interposed in the connection between outlet chamber 56 and outlet passage 38. The size of the choke can be varied easily from installation to installation to compensate for differences in the load volumes which transducer 11 supplies, and in this way the proper rate of change of output pressure can be established.

Cut-off valve 31 is included in transducer 11 to prevent a small leakage of supply air under certain conditions of train charging and emergency operation and is not an essential component. This valve includes a diaphragm-operated valve head 65 which cooperates with a stationary seat 66 to selectively open and close communication between pilot passage 27 and the passage 27a leading to working space 58. Valve head 65 is urged away from seat 66 by the pressure in lower diaphragm chamber 67a which is in continuous communication with supply passage 54, and the valve is urged downward, toward the seat, by the pressure in upper diaphragm chamber 67b which is in continuous communication with transducer outlet passage 38. The effective area of the lower face of diaphragm 67 is equal to the cross sectional area of chamber 67a minus the cross sectional area of the cylinder 68 in which head 65 reciprocates, and consequently is smaller than the effective area of the upper face. Therefore, whenever the ratio of output pressure to supply pressure tends to exceed the ratio of the effective areas, valve 31 will close. In a typical case, the design ratio is 9:10. Thus, once output pressure reaches 90% of supply pressure, no further air can escape from reservoir 18 to atmosphere through pilot valve 45, 49 even though disc 45 remains in application position A.

When the illustrated brake system is in use and the brakes are released, rheostat 16 will be in a position which allows maximum current to flow through control wire 13, and the components of each transducer 11 will be in the positions illustrated in FIG. 2. Although the pressure in outlet passage 38 will be zero and meter spring 42 will be holding piston 37a in its uppermost position, the restoring torque exerted on comparator shaft 24 by calibration spring 36 will not be sufficient to overpower electric torque motor 23 and move disc 45 away from release position R.

When a brake application is required, rheostat 16 is adjusted to reduce the current in control wire 13. This, of course, reduces the torque output of the electric motors 23 and enables the pneumatic torque motor 25 in each transducer to rotate pilot valve disc 45 to application position A. Since, in this position of the disc, pilot valve 45, 49 is open, air will escape from the working space 58 at a rate faster than that at which it can be supplied through restricted passage 59, and the pressure in the space will be dissipated. As a result, supply poppet 52 will open under the action of the pressure acting upon nose 52a, and air will flow from reservoir 18 to brake cylinder 12. The pressure in the brake cylinder and in the communicating working space 37b of air motor 37 will now begin to increase. The rising pressure in space 37b causes piston 37a to move down, thereby expanding calibration spring 36 and reducing the torque which it applies to comparator shaft 24. Accordingly, as the output pressure of the transducer approaches the level corresponding to the selected reduction in control wire current, torque motor 23 will rotate shaft 24 in the counterclockwise direction, as viewed in FIG. 3, and move disc 45 toward the lap position L. When the selected output pressure is reached, the torques developed by the motors 23 and 25 will balance each other, and disc 45 will come to rest in the lap position. Since, in this position of the disc, pilot valve 45, 49 is closed, the main supply poppet 52 will close and interrupt flow from reservoir 18 to brake cylinder 12. Inasmuch as pilot valve 45, 51 is open only in the release positions R and R', main exhaust poppet 53 will remain closed throughout a brake application.

Further reductions in control wire current will produce proportional increases in transducer output pressure until that pressure reaches 90% of the supply pressure in passage 54. As output pressure tends to exceed this level, cut-off valve 31 will automatically close to thereby prevent further venting of working space 58 through pilot valve 45, 49 and maintain main supply poppet 52 closed. This high level of output pressure effects a full application of the brakes.

If, while the brakes are applied, the output pressure of the transducer should decrease as a result, for example, of leakage from the brake cylinder circuit, pneumatic torque motor 25 will automatically shift disc 45 to the application position and cause main supply valve 52 to open. The air which is then admitted into outlet passage 38 raises the output pressure. As the desired output pressure is reestablished, the torque output of motor 25 will decrease, and electric torque motor 23 will return disc 45 to lap position L and cause valve 52 to close. In this manner, transducer 11 always maintains output pressure at the level corresponding to the reduction in control wire current.

The braking effort can be reduced, without first fully releasing the brakes, simply by setting rheostat 16 to establish a higher control wire current. This action unbalances the torques exerted by motors 23 and 25 and causes the former to move disc 45 to release position R and open pilot valve 45, 51. Now, the pressure in working space 62 dissipates, and the pressure in chamber 56, which acts upon annular surface 53b, opens main exhaust poppet 53. As air escapes from brake cylinder 12 through vent port 55, the pressure in outlet passage 38 and in working space 37b decreases. Therefore, piston 37a moves upward under the action of meter spring 42 and compresses calibration spring 36. This, of course, increases the restoring torque which motor 25 applies to comparator shaft 24 and enables it to move disc 45 back toward lap position L as the output pressure approaches the reduced level corresponding to the selected increase in control wire current. When that level of pressure is established, the torques developed by motors 23 and 25 will again be balanced and disc 45 will be in position L. Therefore, both of the pilot valves 45, 49 and 45, 51 and both of the main poppets 52 and 53 will be closed. In the event a full release is selected, control wire current will be raised to a maximum, and transducer 11 will reduce output pressure to zero. Although, under this condition, electric torque motor 23 will hold disc 45 in release position R against the maximum restoring torque which motor 25 can develop, main exhaust poppet 53 will move to the illustrated closed position under the action of spring 61 as soon as the pressure in outlet passage 38 dissipates.

Although, as already mentioned, cut-off valve 31 is not vital to the transducing function, it is important from the practical standpoint because it minimizes leakage in two situations wherein air conservation is desirable. One of these is the case where the train is standing at a terminal with the brakes applied while the reservoirs are being charged from a yard plant. In this case, control wire current is zero, and consequently pneumatic torque motor 25 holds disc 45 in application position A wherein pilot valve 45, 49 is open. In the absence of cut-off valve 31, air could leak from the fully charged system through each of the open pilot valves 45, 49 in the interval between completion of the charging operation and release of the brakes. The second situation concerns those cars which are separated from the compressor 22 by a train break-in-two. In this case, the disc 45 also will move to application position A, and, since the isolated cars may carry no charging equipment of their own, the pressures in their reservoirs and brake cylinders will commence to decrease. In time, a full release of the brakes will take place. The cut-off valve 31 eliminates this condition by automatically closing the pilot valve vent path as soon as the brakes are fully applied.

Figure 4:
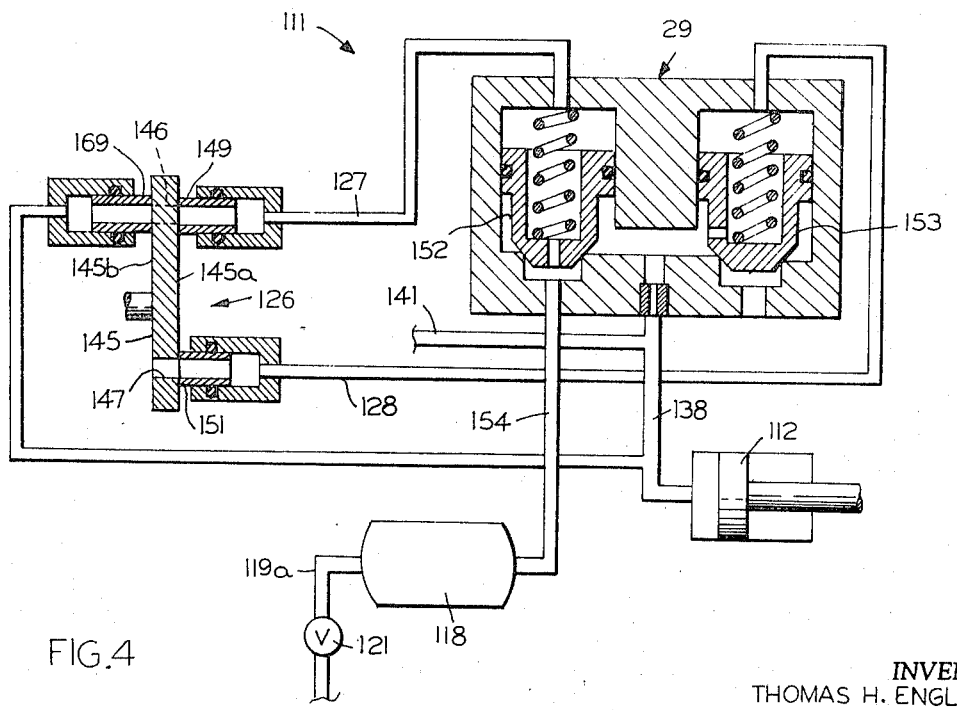
FIG. 4 is a schematic diagram illustrating an air-conservation modification which may be employed in the FIG. 2 transducer.

The conditions just described can be avoided, and air can be conserved during normal brake applications, by using the alternative pilot valve assembly 126 shown in FIG. 4. In this embodiment 111, the back face 145b of disc 145 is ground and lapped and cooperates with a third tubular, floating seat 169 which serves to transmit to outlet passage 38 the air which escapes from pilot passage 27 through pilot valve 145, 149. Since this design provides no pilot vent path from supply passage 54 to atmosphere, it wastes no air and does not require a cut-off valve 31. However, elimination of this path does impair the snappy action of main supply poppet 52.

It is important to observe that the illustrated transducer includes three features which combine to overcome the tendency to hunt and thus stabilize its operation. The first of these is the sinusoidal response characteristic of torque motor 23 which causes the output torque to vary slightly with the angular position of comparator shaft 24. When the comparator shaft 24 is in application position A and the torque output of motor 23 rises slightly above the resisting torque developed by pneumatic motor 25, shaft 24 will commence to move toward a release position R or R'. However, as soon as the shaft commences to turn, the torque output per unit of current of motor 23 will decrease. Consequently, a greater current will be required to move shaft 24 to the release position than was needed to move it out of application position. Similarly, as shaft 24 moves toward the application position, the resisting torque per unit of current developed by motor 23 gradually increases. Therefore, the current reduction required to enable pneumatic torque motor 25 to move shaft 24 all the way to application position will necessarily be greater than the current reduction required to initiate movement of shaft 24 away from release position. Although the sinusoidal effect is not great, it does tend to stabilize rotation of comparator shaft 24.

The second stabilizing factor is the spring rate of calibration spring 36. The force this spring exerts varies with its deflection, and the spring must be slightly compressed in order for comparator shaft 24 to move from application to release position, or allowed to expand slightly as the shaft moves from release to application position. Consequently, transducer 11 cannot shift from the application to the release condition or vice versa unless the torque output of electric motor 23 changes by an amount greater than that required to initiate the change in transducer condition. This, of course, tends to keep the transducer from hunting back and forth between the two extreme conditions.

The third stabilizing characteristic is afforded by the knife edges 44a and 44b and the cooperating yoke 43. The knife edges can be so set that, when shaft 24 is in application position, they lie either above or below the horizontal plane containing the shaft axis. In the former case, the moment arm of the point of contact between the active knife edges 44a or 44b and the yoke 43 will increase slightly as the shaft rotates from application position to release position; consequently, the restoring torque exerted on shaft 24 by pneumatic motor 25 at a given value of output pressure will increase with movement of the shaft toward release position. This has the effect of increasing stability. On the other hand, if the knife edges 44a and 44b are below the shaft axis in application position A, the moment arm of the point of contact, and consequently the torque output of pneumatic motor 25, will decrease with movement of the shaft toward release position. This arrangement tends to reduce stability. The specific setting of the knife edges which is used in a particular case depends upon the combined effect of the other two stability-influencing characteristics and may be selected to either augment or oppose that effect.

DESCRIPTION OF FIG. 5 EMBODIMENT

Although the embodiments of the transducer described thus far have the advantage of being simple, they do possess certain undesirable characteristics which limit their utility. Perhaps the chief disadvantage is the fact that the main supply and exhaust valves 52 and 53 are not balanced with respect to transducer output pressure. Because of this, the speed at which each valve responds to a given change in the setting of pilot valve assembly 26 will depend upon the level of the output pressure at the time the change is effected. This makes it difficult for the designer to dimension the parts for proper operation. Another disadvantage is the fact that, during a brake release, the main exhaust valve 53 will close before the pressure in outlet passage 38 has been completely dissipated. While the air remaining in the brake cylinders is not trapped, but can escape to atmosphere through the pilot path comprising passage 63, working space 62, pilot passage 28 and pilot valve 45, 51, this escape path is restricted. Therefore, complete dissipation of output pressure could take considerable time. It also will be observed that, since the main valves 52 and 53 are mechanically separate from each other, there is no guarantee that both valves will not be open at the same time. If, as a result of a malfunction, this condition should occur, the air in reservoir 18 would escape to atmosphere and the system would be rendered incapable of applying the brakes. Finally, it will be noted that, while these embodiments will automatically apply the brakes when a break occurs in control wire 13, they do not afford this fail-safe protection as a result of a break in charge pipe 19. These disadvantages are eliminated in the improved transducer 211 of FIG. 5.

Referring to FIG. 5, the main supply and exhaust valves 252 and 253, respectively, are carried by balancing spools 252d and 253d which reciprocate in axially aligned bores and are arranged so that as each moves in the valve-opening direction it engages the other and causes it to move in the valve-closing direction. The opposite ends of each balancing spool have equal cross sectional areas and are interconnected by an axial passage 252e or 253e extending through the spool and a cross slot 252f or 253f in the end face remote from outlet chamber 256. This arrangement renders the valves insensitive to changes in output pressure. The two valves 252 and 253 are biased closed by a common compression spring 271 which is interposed between them, and each is moved in the opening direction by piloted motor means including a compression spring 257 or 261, and an opposing diaphragm motor 252c, 258 or 253c, 262. The two piloted motor means employ identical parts except that the one associated with supply valve 252 incorporates an additional spring 272. The arrangement of the motor means is such that:

(a) springs 257 and 272 open supply valve 252 and hold exhaust valve 253 closed when working space 258 is vented and working space 262 is pressurized, (b) spring 261 opens exhaust valve 253 and holds supply valve 252 closed when working space 258 is pressurized and working space 262 is vented, (c) spring 271 closes both valves when both of the working spaces 258 and 262 are pressurized, and (d) springs 257 and 272 open supply valve 252 and hold exhaust valve 253 closed when both working spaces are vented.

As will be evident from the following description, the first three of these effects are produced, respectively, during the ordinary application, release and lap conditions of the transducer 211. The fourth effect occurs when charge pipe pressure is dissipated.

The pilot valve assembly 226 employed in the FIG. 5 embodiment is constructed in the same way as its counterpart 26 in FIG. 1 except that here, in addition to a pilot passage 227 or 228, each of the control chambers 249a and 251a is provided with a supply passage 249b or 251b which is connected with branch pipe 219a through a common passage 273 containing a pressure reducer 274. The pressure reducer is set to limit to a relatively low value, for example, 10 p.s.i., the pressure of the air supplied to the two pilot valves. The disc 245 of assembly 226 has the same five operative positions as the disc 45 in the first embodiment; therefore, only exhaust pilot valve 245, 251 is open in the release positions, only supply pilot valve 245, 249 is open in the application position, and both valves are closed in the lap positions. Since the chambers 249a and 251a of these valves are in constant communication with branch pipe 219a, it follows that under ordinary conditions (i.e., when the charge pipe is pressurized), the pilot passage 227 or 228 of each valve is pressurized to the setting of reducer 274 whenever the valve is closed and is vented to atmosphere whenever the valve is open.

When transducer 211 is in use, and the current in train wire 213 is a maximum, torque motor 223 will hold pilot valve assembly 226 in one of its release positions so that pilot valve 245, 249 will be closed and pilot valve 245, 251 will be open. Under this condition, pilot passage 228 and working space 262 will be vented, and pilot passage 227 and working space 258 will be pressurized. Therefore, spring 261 will hold main exhaust valve 253 open and main supply valve 252 closed. As a result, outlet passage 238 and brake cylinder 212 will be vented to atmosphere through port 255. At this time, pneumatic torque motor 225 will be exerting a maximum restoring torque on comparator shaft 224.

When control wire current is reduced to effect a brake application, pneumatic torque motor 225 will rotate disc 245 to application position, thereby causing pilot valves 245, 249 and 245, 251 to open and close, respectively. Now, pilot passage 227 and working space 258 are vented, and pilot passage 228 and working space 262 are pressurized. Consequently, springs 257 and 272 open main supply valve 252 and hold main exhaust valve 253 closed. This permits air to flow from reservoir 218 into outlet chamber 256 and outlet passage 238, and thereby raises the pressure in the brake cylinder 212. As in the case of the FIG. 2 transducer, the torque developed by pneumatic torque motor 225 decreases as outlet pressure rises. Therefore, when the output pressure reaches a level corresponding to the reduction in control wire current, electric motor 223 will have moved disc 245 to a lap position in which both of the pilot valves 245, 259 and 245, 251 are closed. At this time, both of the working spaces 258 and 262 will be under pressure, and therefore spring 271 will maintain both of the main valves closed. As in the case of its counterpart 11, transducer 211 will compensate for leakage from the output side of the system and maintain output pressure at the selected level until there is a further change in control wire current. At that time, of course, disc 245 will be shifted to the application position or to a release position, depending upon the sense of the change, and cause main valve assembly 229 to either admit air into or exhaust air from outlet passage 238 as required to restore correspondence between output pressure and control wire current.

When control wire current is increased to the maximum value to release the brakes, electric motor 223 will shift disc 245 to, and hold it in, one of the release positions. Working spaces 258 and 262 will now be pressurized and vented, respectively, so spring 261 will again open main exhaust valve 253 and hold supply valve 252 closed. Since the exhaust valve 253 stays open as long as disc 245 remains in a release position, it is evident that brake cylinder pressure will be dissipated completely without undue delay.

It should be noted that the pilot circuit in FIG. 5 is supplied directly from branch pipe 219a, and not through the supply passage 254 leading from reservoir 218, and that the check valve 221a, which in FIG. 2 was located in cut-off valve 21, is interposed in the connection between the reservoir and the branch pipe 219a. This arrangement in combination with the spring 272 in main valve assembly 229, insures that the transducer will automatically apply the brakes whenever the charge pipe is vented, as a result, for example, of equipment failure or a break-in-two. Under such an emergency condition, the pressure in branch pipe 219a and in the entire pilot circuit (i.e., passages 273, 227 and 228 and working spaces 258 and 262) will dissipate quickly and enable springs 257 and 272 to open main supply valve 252 and close main exhaust valve 253. Since check valve 221a prevents loss of air from reservoir 218 through the vented branch and charge pipes, air will be available to fully apply the brakes. The supply valve will remain open and a full application will be maintained, regardless of the position of pilot valve assembly 26, until the pressure in the pilot circuit is restored to the setting of pressure reducer 274.

Separation of the piloting and brake-actuating circuits in FIG. 5 also eliminates the main condition, namely, loss of reservoir air through the supply pilot valve, which makes desirable the use of cut-off valve 31 in transducer 11. While pilot valve 245, 249 in transducer 211 will continuously bleed air from the charge pipe during the period of a full brake application, this leakage is not considered important because it is small and in no event will it adversely affect the output pressure of the transducer. However, if desired, this small loss can be minimized by incorporating the FIG. 2 cut-off valve 31 in common passage 273.

Although it should be obvious, I want to stress that transducer 211 also will automatically initiate a full brake application whenever current flow through control wire 213 is interrupted.

DESCRIPTION OF THE EMBODIMENT
OF FIGS. 6 AND 7

The transducer 211 of FIG. 5 is superior in several respects to the versions shown in FIGS. 2–4, but it has two undesirable features. First, it will be noted that when the transducer is in release position, pilot valve 245, 251 is open, and air will escape continuously from the charge pipe. Since the transducer assumes the release position most of the time, it is obvious that this arrangement is inefficient from the standpoint of air consumption. The second undesirable feature concerns the fact that the transducer does not initiate a brake application under emergency conditions until charge pipe pressure reduces below the setting of pressure reducer 274. The pilot circuit requires only a very low pressure, and therefore it is apparent that the automatic application will be delayed until charge pipe pressure has been almost completely dissipated. The preferred transducer 311 shown in FIGS. 6 and 7 eliminates both of these deficiencies.

Examination of FIGS. 6 and 7 will show that there are three essential differences between the preferred transducer 311 and its FIG. 5 counterpart. The first of these concerns the design of the valve actuation scheme employed in main valve assembly 329. In the preferred design, the component parts of the piloted motor means associated with main exhaust valve 353 have been reversed so that the diaphragm motor 353c, 362 shifts the exhaust valve in the opening direction, and this movement is opposed by the spring 361. This change eliminates the need for an auxiliary spring corresponding to the spring 272 in FIG. 2, and establishes the following operating schedule for the main valves:

(a) spring 357 opens supply valve 352 and holds exhaust valve 353 closed when both of the working spaces 358 and 362 are vented,
(b) diaphragm motor 353c, 362 opens exhaust valve 353 and holds supply valve 352 closed when both of the working spaces 358 and 362 are pressurized, and
(c) spring 371 closes both of the main valves when working space 358 is pressurized and working space 362 is vented.

The second difference between the transducers 211 and 311 relates to the design of the exhaust pilot valve 345, 351 and is directly attributable to the change in the actuation scheme for the main valves. As shown in FIG. 7, the floating seat 351 of the exhaust pilot valve cooperates with an arcuate slot 375 which extends through valve disc 345 and which is arranged to register with the head 351 only in the application position A and in each of the lap position L and L'. This design produces the schedule of pilot pressures required by the main valve asembly 329. Since one effect of these first two differences is to obviate opening of either of the piolt valves 345, 349 and 345, 351 in the release positions, the preferred transducer clearly minimizes air consumption. And, it is important to note, this result is achieved without impairing the pneumatic fail-safe character of the transducer. In other words, venting of the pilot circuit of the transducer 311 will automatically result in a full brake application.

The third distinguishing feature of transducer 311 is a shuttle valve 376 which serves selectively to connect the pilot circuit with branch pipe 319a or with the atmosphere depending upon the level of the pressure in branch pipe 319a. Valve 376 is biased to the exhaust position by a spring 376a and is shifted to the illustrated supply position by a motor 376b which responds to the pressure in the branch pipe. When valve 376 is in the exhaust position, it vents the pilot circuit and initiates the full brake application which is desired under emergency conditions. However, in contrast to the FIG. 5 embodiment, this action occurs at a branch pipe pressure which is determined by spring 376a and which is considerably higher than the setting of pressure reducer 374. Thus, transducer 311 affords faster pneumatic fail-safe action than its FIG. 5 counterpart.

A corollary of the emergency function of shuttle valve 376 is the fact that the valve keeps the pilot circuit vented, and thus precludes release of the brakes, until charge pipe pressure rises above the level established by spring 376a. This function may be viewed as a protection feature since it prevents movement of the train until the supply reservoirs have been charged sufficiently to guarantee safe braking capability.

DESCRIPTION OF THE EMBODIMENTS OF FIGS. 8–10

In all of the preceding embodiments, the main valve assemblies employ poppet type values, but it should be evident that rotary, slide, ring-packed spool or closely fitted plain spool valves could be used. This is demonstrated by FIGS. 8 and 9 which show plain spool versions of the main valve assemblies employed in the embodiments of FIGS. 5 and 6. Although these various alternatives are workable, the energy required to shift each of them between its operative positions is greater than in the case of the poppet valve. This is attributable to longer valve travel, greater friction and perhaps higher inertia. Since the rate of flow through the piolt valves during a change in condition is limited by the necessarily small size of these components, and the time duration of the flow must be kept small in order to insure the fastest possible response of the transducer, it will be evident that the total energy available to effect shifting of the main valves is quite limited. Because of this, the poppet type of valve is considered the preferred form for the main valves.

Each of the transducers described herein employs bidirectional torque motors and a bidirectional pilot valve assembly so that, regardless of the direction of current flow through the control wire, the transducer will perform its intended function. As indicated earlier, this is the preferred design because it permits use of a single control wire. However, it should be noted that the desired transducing function can be carried out by transducers 11' employing unidirectional components merely by using the alternative two-wire control circuit shown in FIG. 10. In this case, the controlling unit 14 can be located at either end of the train without impairing proper operation provided that the terminals 13a of each car are connected to the terminals 13b of the adjacent cars.

In order to avoid misunderstanding, it should be noted that the general reference numerals used in the preambles of the following claims indicate to which of the main illustrated embodiments the various claims are directed. In cases where a claim applies to more than one illustrated embodiment, the reference numerals for only one of those embodiments are used in the body of the claim.

I claim:
1. An electric current-to-pneumatic pressure transducer (11, 111, 211 or 311) comprising:
   (a) a source (18, 19, 22) of compressed air, and an outlet passage (38) in which the pneumatic pressure is to be produced;
   (b) a comparator member (24) mounted for movement between an application position (A) and a release position (R);
   (c) electric motor means (23) responsive to the current which is to be transduced and connected to shift the comparator member toward said release position, the shifting force produced by the motor means varying substantially linearly with the current within the range of movement of the comparator member;
   (d) pneumatic motor means (25) connected with the outlet passage (38) and acting on the comparator member (24) in opposition to the electric motor means (23), the pneumatic motor means exerting a resisting force which decreases as the pressure in the outlet passage increases;
   (e) first and second pilot valves (45, 49 and 45, 51) operated by the comparator member and each having a control chamber (49a or 51a) and being adapted to open and close in exhaust path (46 or 47) leading from the control chamber, the valves being substantially balanced with respect to the pressures in their control chambers so that their opening and closing movements are essentially unaffected by said pressures;
   (f) a supply valve (52) controlling communication between the source (18, 19, 22) and the outlet passage (38), and an exhaust valve (53) controlling communication between the outlet passage (38) and an exhaust connection (55); and
   (g) actuating means, including first and second piloted pressure motors (52c, 58 and 53c, 62) connected, respectively, with the control chambers of the first and second pilot valves, for opening the supply valve (52) when the comparator member (24) is in said application position (A), for opening the exhaust valve when the comparator member is in said release position (R), and for closing both valves when the comparator member is in an intermediate, lap position (L).

2. A transducer (11, 111, 211 or 311) as defined in claim 1 in which the pneumatic motor means includes:
   (a) a drive member (35) connected with the comparator member (24) so as to resist motion of the latter under the action of the electric motor means (23);
   (b) a compression type calibration spring (36) reacting between the drive member (35) and a seat (37a) and causing the drive member to urge the comparator member (24) toward the application position;
   (c) a pneumatic motor (37) connected with the outlet passage (38) and arranged to move the seat in a spring-expanding direction; and
   (d) a compression type meter spring (42) opposing movement of the pneumatic motor.

3. A transducer (11, 111, 211 and 311) as defined in claim 1 in which each pilot valve comprises a floating, tubular seat (49 or 51) which is biased by the pressure in its control chamber (49a or 51a) into engagement with a flat ported head (45) which is connected with the comparator member (24) and slides across its face.

4. A transducer (11, 111, 211 or 311) as defined in claim 1 in which:
   (a) the comparator member (24) is mounted for movement between a pair of release positions (R, R') at opposite sides of said application position (A);
   (b) the electric motor means (23) is adapted to shift said release positions depending upon the direction of flow therethrough of said current;

(c) the pneumatic motor means (25) is adapted to resist movement of the comparator member toward each release position; and (d) the actuating means is adapted to open the exhaust valve in either of said release positions (R and R') and to close both the supply valve (52) and the exhaust valve (53) when the comparator member (24) is in an intermediate lap position (L or L') between each of the release positions and the application position (A).

5. A transducer (11, 111, 211 or 311) as defined in claim 4 in which the comparator member (24) is a rotary shaft, and the pneumatic motor means (25) includes:

(a) a reciprocable drive member (35) which is urged in a predetermined direction by a compression type calibration spring (36) which reacts against a movable seat (37a);

(b) torque-applying means (43, 44, 44a, 44b) interconnecting the drive member and the shaft so that the drive member tends to center the shaft in said application position (A);

(c) a pneumatic motor (37) connected with the outlet passage (38) and arranged to move said seat (37a) in a direction to expand the calibration spring; and (d) a compression type meter spring (42) opposing movement of the pneumatic motor.

6. A transducer (11, 111, 211 or 311) as defined in claim 5 in which the torque-applying means comprises:

(a) a transverse arm element (44) fixed to rotate with the shaft (24) and extending in opposite directions from the shaft axis;

(b) a cooperating element (43) carried by the drive member; and (c) a pair of knife edges (44a, 44b) carried by one of said elements and bearing against the other when the shaft is in the application position (A), the knife edges being located at opposite sides of the shaft axis so that one or the other applies a resisting torque to the shaft.

7. A transducer (11 or 111) as defined in claim 1 in the comparator member toward one or the other of which:

(a) the control chamber (49a) of the first pilot valve (45, 49) is connected with the source (18, 19, 22) through a first passage (27, 27a) containing a flow restriction (59), and the control chamber (51a) of the second pilot valve (45, 51) is connected with the outlet passage (38) through a second passage (28, 56) containing a flow restriction (63);

(b) the pilot valves are so arranged that only the first (45, 49) is open when the comparator member (24) is in the application position (A), only the second (45, 51) is open when the comparator member is in the release position (R), and both are closed when the comparator member is in the lap position (L);

(c) the supply valve (52) is urged closely by a spring (57) and by the first piloted pressure motor (52c, 58), and the exhaust valve (53) is urged closed by a spring (61) and by the second piloted pressure motor (53c, 63); and (d) the actuating means includes means (52a) responsive to the pressure of the source for shifting the supply valve (52) in the opening direction, and means (53b) responsive to the pressure in the outlet passage (38) for shifting the exhaust valve in the opening direction.

8. A transducer (11) as defined in claim 7:

(a) in which the exhaust paths (46, 47) of the pilot valves (45, 49 and 45, 51) lead to the atmosphere; and (b) which includes a cut-off valve (31) which is interposed in the first passage (27, 27a) and serves to close and open the first passage when the pressure in the outlet passage is greater and less, respectively, than a predetermined fraction of the source pressure.

9. A transducer (111) as defined in claim 7 in which:

(a) the comparator member (24) is a shaft mounted leads to the outlet passage (138); and (b) the exhaust path (147) of the second pilot valve leads to atmosphere.

10. A transducer (11 or 111) as defined in claim 1 in which (a) the comparator member (24) is a shaft mounted for rotation between release positions (R and R') at opposite sides of said application position (A);

(b) the electric motor means (23) comprises a rotary torque motor which rotates the shaft toward one or the other of said release positions depending upon the direction of flow therethrough of said current;

(c) the pneumatic motor means (25) comprises a drive member (35), a compression type calibration spring (36) reacting between the drive member and a movable seat (37a), a pneumatic motor (37) connected with the outlet passage (38) and arranged to move the seat in a spring-expanding direction, a compression type meter spring (42) opposing movement of the pneumatic motor, and means (43, 44, 44a, 44b) connecting the drive member with the shaft in such manner that the force exerted by the calibration spring always tends to center the shaft in the application position;

(d) each pilot valve includes a tubular, floating seat (49 or 51) biased by the pressure in its control chamber (49a or 51a) into engagement with a flat face (45a) of a common disc (45) which is connected to rotate with the shaft (24), the disc containing a first through port (46) which registers with the tubular seat (49) of the first pilot valve when the shaft is in application position (A), and second and third through ports (47, 48) which register, respectively, with the tubular seat (51) of the second pilot valve when the shaft is in one or the other of said release positions (R and R');

(e) the control chamber (49a) of the first pilot valve (45, 49) is connected with the source through a first passage (27, 27a) containing a flow restriction (59), and the control chamber (51a) of the second pilot valve (45, 51) is connected with the outlet passage (38) through a second passage (28, 56) containing a flow restriction (63);

(f) the supply and exhaust valves (52, 53) are separate, poppet type valves, the supply valve (52) being urged closed by a spring (57) and by the first piloted motor (52c, 58), and the exhaust valve (53) being urged closed by a spring (61) and by the second piloted motor (53c, 62); and (g) the actuating means includes means (52a, 52b) responsive to both source pressure and the pressure in the outlet passage for shifting the supply valve (52) in the opening direction, and means (53b) responsive to the pressure in the outlet passage for shifting the exhaust valve (53) in the opening direction.

11. A transducer (11) as defined in claim 10:

(a) in which the through ports (46–48) in the disc (45) are in continuous communication with the atmosphere; and (b) which includes a cut-off valve (31) interposed in the first passage (27, 27a) and serving to close and open the first passage when the pressure in the outlet passage is greater and less, respectively, than a predetermined fraction of the source pressure.

12. A transducer (111) as defined in claim 10:

(a) in which the second and third through ports (147, 148) are in continuous communication with the atmosphere; and (b) which includes a third pilot valve (145, 169) which comprises a control chamber (169a) connected with the outlet passage (138), and a tubular, floating seat (169) which is urged against an opposite, flat face (145b) of the common disc (145) and is positioned to register with the first through port (146) when the shaft (124) is in application position (A).

13. A transducer (211 or 311) as defined in claim 1 in which
   (a) the source includes an air compressor adapted to deliver compressed air to a charging passage (219a), and an air reservoir (218) connected to receive air from the charging passage through a check valve (221a);
   (b) the supply valve (252) is connected to receive air from the reservoir (218); and
   (c) the control chambers (249a, 251a) of the pilot valves are connected to receive air from the charging passage (219a) through a common passage (273) leading from the charging passage and continuing a pressure reducer (274), and through a pair of restricted branch passages (249b, 259 and 251b, 263).

14. A transducer (311) as defined in claim 13 which includes a shuttle valve (376) which is adapted to selectively connect the common passage (373) with the charging passage (319a) or with the atmosphere depending upon whether the pressure in the charging passage is above or below a predetermined value.

15. A transducer (211 or 311) as defined in claim 1 in which the supply and exhaust valves (252, 253) are mechanically associated in such manner that when either is open it holds the other closed.

16. A transducer (211 or 311) as defined in claim 15 in which the supply and exhaust valves (252, 253) are poppet type valves, each of which is balanced with respect to the pressure in the outlet passage.

17. A transducer (211) as defined in claim 1 in which:
   (a) the control chambers (249a, 251a) of the pilot valves are connected with the source through flow restrictions (259, 263);
   (b) the pilot valves are so arranged that only the first (245, 249) is open when the comparator member (224) is in application position (A), only the second (245, 251) is open when the comparator member is in release position (R), and both are closed when the comparator member is in lap position (L); and
   (c) the actuating means comprises common spring means (271) which urges the supply and exhaust valves closed, second spring means (257, 272) which urges the supply valve (252) open and is opposed by the first piloted motor (252c, 258), and third spring means (261) which urges the exhaust valve (253) open and is opposed by the second piloted motor (253c, 262).

18. A transducer (211) as defined in claim 17 in which the second spring means (257, 272) exerts a greater force than either the common spring means (271) or the third spring means (261), whereby it opens the supply valve (252) whenever the first piloted motor (252c, 258) is vented.

19. A transducer (211) as defined in claim 18 in which the supply and exhaust valves (252, 253) are mechanically associated in such manner that when either is open it holds the other closed.

20. A transducer (211) as defined in claim 19 in which
   (a) the source includes an air compressor adapted to deliver compressed air to a charging passage (219a), and an air reservoir (218) connected to receive air from the charging passage through a check valve (221a);
   (b) the supply valve (252) is connected to receive air from the reservoir (218); and
   (c) the control chambers (249a, 251a) of the pilot valves are connected to receive air from the charging passage (219a) through a common passage (273) leading from the charging passage and containing a pressure reducer (274), and through a pair of restricted branch passages (249b, 259 and 251b, 263).

21. A transducer (211) as defined in claim 1 in which:
   (a) the comparator member (224) is a shaft mounted for rotation between release positions (R and R') at opposite sides of said application position (A);
   (b) the electric motor means (223) comprises a rotary torque motor which rotates the shaft toward one or the other of said release positions depending upon the direction of flow therethrough of said current;
   (c) the pneumatic motor means (225) comprises a drive member (235), a compression type calibration spring (236) reacting between the drive member and a movable seat (237a), a pneumatic motor (237) connected with the outlet passage (238) and arranged to move the seat in a spring-expanding direction, a compression type meter spring opposing movement of the pneumatic motor, and means (243, 244, 244a, 244b) connecting the drive member with the shaft in such manner that the force exerted by the calibration spring always tends to center the shaft in the application position;
   (d) each pilot valve includes a tubular, floating seat (249 or 251) biased by the pressure in its control chamber (249a or 251a) into engagement with a flat face (245a) of a disc (245) which is connected to rotate with the shaft (224), the disc containing a first through port (246) which registers with the tubular seat (249) of the first pilot valve when the shaft is in application position (A), and second and third ports (247, 248) which register, respectively, with the tubular seat (251) of the second pilot valve in one or the other of the release positions (R and R');
   (e) the source includes an air compressor adapted to deliver compressed air to a charging passage (219a), and an air reservoir (218) connected to receive air from the charging passage through a check valve (221a);
   (f) the supply valve (252) is connected to receive air from the reservoir;
   (g) the control chambers (249a, 251a) of the pilot valves are connected to receive air from the charging passage (219a) through a common passage (273) leading from the charging passage and containing a pressure reducer (274), and a pair of restricted branch passages (249b, 259 and 251b, 263); and
   (h) the actuating means comprises common spring means (271) which urges the supply and exhaust valves (252, 253) closed, second spring means (257, 272) which urges the supply valve (252) open and is opposed by the first piloted motor (252c, 258), and third spring means (261) which urges the exhaust valve (253) open and is opposed by the second piloted motor (253c, 262).

22. A transducer (211) as defined in claim 21 in which:
   (a) the supply and exhaust valves (252, 253) are poppet type valves balanced with respect to the pressure in the outlet passage (238), and the valves are mechanically associated in such manner that when either is open it holds the other closed; and
   (b) the second spring means (257, 272) exerts a greater force than either the common spring means (271) or the third spring means (261), whereby it opens the supply valve whenever the first piloted motor (252c, 258) is vented.

23. A transducer (311) as defined in claim 1 in which:
   (a) the control chambers (349a, 351a) of the pilot valves are connected with the source through flow restrictions (359, 363);

(b) the pilot valves are so arranged that both are open when the comparator member (324) is in application position (A), both are closed when the comparator member is in release position (R), and only the second is open when the comparator member is in lap position (L);

(c) the second piloted motor (353c, 362) is arranged to shift the exhaust valve (353) open and is opposed by first spring means (361); and (d) the actuating means comprises common spring means (371) which urges the supply and exhaust valves closed, and third spring means (357) which urges the supply valve (352) open and is opposed by the first piloted motor (352c, 358).

24. A transducer (311) as defined in claim 23 in which the third spring means (357) exerts a greater force than the common spring means (371), whereby it opens the supply valve whenever both of the piloted motors (352c, 358 and 353c, 362) are vented.

25. A transducer (311) as defined in claim 24 in which the supply and exhaust valves (352, 353) are mechanically associated in such manner that when either is open it holds the other closed.

26. A transducer (311) as defined in claim 25 in which:
(a) the source includes an air compressor adapted to deliver compressed air to a charging passage (319a), and an air reservoir (318) connected to receive air from the charging passage through a check valve (321a);
(b) the supply valve (352) is connected to receive air from the reservoir (318); and
(c) the control chambers (349a, 351a) of the pilot valves are connected to receive air from the charging passage (319a) through a common passage (373) leading from the charging passage and containing a pressure reducer (374), and a pair of restricted branch passages (349b, 359 and 351b, 363).

27. A transducer (311) as defined in claim 26 which includes a shuttle valve (376) which is adapted to selectively connect the common passage (373) with the charging passage (319a) or with the atmosphere depending upon whether the pressure in the charging passage is above or below a predetermined value.

28. A transducer (311) as defined in claim 1 in which:
(a) the comparator member (324) is a shaft mounted for rotation between release positions (R and R') at opposite sides of said application position (A);
(b) the electric motor means (323) comprises a rotary torque motor which rotates the shaft toward one or the other of said release positions depending upon the direction of flow therethrough of said current;
(c) the pneumatic motor means (325) comprises a drive member (335), a compression type calibration spring (336) reacting between the drive member and a movable seat (337a), a pneumatic motor (337) connected with the outlet passage (338) and arranged to move the seat in a spring-expanding direction, a compression type meter spring (342) opposing movement of the pneumatic motor, and means (343, 344, 344a, 344b) connecting the drive member with the shaft in such a manner that the force exerted by the calibration spring always tends to center the shaft in the application position;

(d) each pilot valve includes a tubular, floating seat (349 or 351) biased by the pressure in its control chamber (349a, 351a) into engagement with a flat face (345a) of a disc (345) which is connected to rotate with the shaft (324), the disc containing a first through port (346) which registers with the tubular seat (349) of the first pilot valve when the shaft is in application position (A), and a second through port (375) which registers with the tubular seat (351) of the second pilot valve when the shaft is in either the application position or a lap position (L or L') between the application position and each release position;

(e) the source includes an air compressor adapted to deliver compressed air to a charging passage (319a), and an air reservoir (318) connected to receive air from the charging passage through a check valve (321a);

(f) the supply valve (352) is connected to receive air from the reservoir;

(g) the control chambers (349a, 351a) of the pilot valves are connected to receive air from the charging passage (319a) through a common passage (373) leading from the charging passage and containing a pressure reducer (374), and through a pair of restricted branch passages (349b, 359 and 351b, 363);

(h) the second piloted motor (353c, 362) urges the exhaust valve (353) open and is opposed by first spring means (361); and (i) the actuating means comprises common spring means (371) which urges the supply and exhaust valves closed, and third spring means (357) which urges the supply valve (352) open and is opposed by the first piloted motor (352c, 358).

29. A transducer (311) as defined in claim 28 which includes a shuttle valve (376) which is adapted to selectively connect the common passage (373) with the charging passage (319a) or with the atmosphere depending upon whether the pressure in the charging passage is above or below a predetermined value.

30. A transducer (311) as defined in claim 28 in which:
(a) the supply and exhaust valves (352, 353) are poppet type valves balanced with respect to the pressure in the outlet passage (338), and the valves are mechanically associated in such manner that when either is open it holds the other closed; and
(b) the third spring means (357) exerts a greater force than the common spring means (371), whereby it opens the supply valve whenever both of the piloted motors (352c, 358 and 353c, 362) are vented.

References Cited

UNITED STATES PATENTS

| | | | |
|---|---|---|---|
| 3,063,757 | 11/1962 | Wright | 303—20 |
| 3,206,257 | 9/1965 | May | 303—15 X |
| 3,240,536 | 3/1966 | Rouillon | 303—16 |

DUANE A. REGER, Primary Examiner

U.S. Cl. X.R.

303—15